United States Patent [19]

Sasaki

[11] Patent Number: 4,791,484
[45] Date of Patent: Dec. 13, 1988

[54] TAPE CARTRIDGE CASE COMPOSITION FOR REDUCING MODULATION NOISE

[75] Inventor: Sigeo Sasaki, Kyoto, Japan

[73] Assignee: Hitachi Maxell, Ltd., Osaka, Japan

[21] Appl. No.: 903,449

[22] Filed: Sep. 4, 1986

[30] Foreign Application Priority Data

Sep. 4, 1985 [JP] Japan .................. 60-195174

[51] Int. Cl.⁴ ............................ G11B 23/02
[52] U.S. Cl. .................... 360/132; 206/387
[58] Field of Search ............ 360/132, 133; 242/197, 242/198, 199; 206/387, 524.6

[56]  References Cited

U.S. PATENT DOCUMENTS 4,545,500 10/1985 Yamaguchi et al. ......... 242/197 X
4,639,386 1/1987 Akao .................. 206/316 X

FOREIGN PATENT DOCUMENTS 0117768 7/1984 Japan ................ 360/132
0178033 9/1985 Japan ................ 206/387
2074130 10/1981 United Kingdom ......... 360/132

Primary Examiner—Robert S. Tupper
Assistant Examiner—Andrew L. Sniezek
Attorney, Agent, or Firm—Birch, Stewart, Kolasch & Birch

[57]  ABSTRACT

A tape cartridge which comprises a cartridge case made of a complex plastic material made of polyolefin resin, mixed with a filler of 45 percent to 65 percent by weight of the plastic material wherein the filler includes particles made of at least one of calcium carbonate and barium sulfate. The tape cartridge has a dynamic loss of more than $1 \times 10^9$ dyne/cm$^2$ within a range of oscillation frequency of 0.1 Hz to 1000 Hz. Accordingly, the tape cartridge of the present invention can prevent a running tape arranged in the tape cartridge from oscillating since outside oscillation is attenuated in the tape cartridge. Also the tape cartridge can reduce modulation noise which occurs because of the outside oscillation.

11 Claims, 3 Drawing Sheets

TAPE CARTRIDGE CASE COMPOSITION FOR REDUCING MODULATION NOISE

BACKGROUND OF THE INVENTION

1. Field of the Invention

The present invention relates to a tape cartridge, and more particularly, to a tape cartridge which reduces modulation noise that occurs during the recording and playing back of a tape.

2. Description of the Prior Art

Modulation noise is a problem in various magnetic tape cartridges, and modulation noise occurs because of improper contact between the running tape and the magnetic head and the outside oscillation applied from a device arranged outside of the magnetic tape cartridge to the running tape and the magnetic head. Modulation noise occurring because of improper contact has been studied, and modulation noise can conventionally be suppressed by improving the magnetic tape cartridge.

An essential object of the present invention is to suppress modulation noise occurring because of outside oscillation. For example, the oscillation of a motor arranged in a tape recorder is transferred through the case of the tape recorder into the cartridge case, which results in the transferred oscillation causing the oscillation of the running tape with a slight narrow width. A modulation noise thereby overlaps the signal to be recorded and played back. Attention has not been paid to the reduction of modulation noise which occurs due to outside oscillation. However, in general, modulation noise has been prevented by supporting the oscillation source, such as the motor etc., by a member used to prevent oscillation by preventing the transfer of oscillation to the cartridge case.

The reduction of modulation noise can certainly be suppressed by the aforementioned prevention method, however, it is not enough to reduce the modulation noise, and another prevention method for reducing the modulation noise should be applied to the magnetic tape cartridge itself.

In general, the attenuation of mechanical oscillation varies depending upon the materials of the oscillation source, the transferring member, and the tape cartridge. The outside oscillation leading to the modulation noise is transferred through the tape cartridge to the tape arranged in the tape cartridge.

SUMMARY OF THE INVENTION

An essential object of the present invention is to provide a tape cartridge with the same softness and hardness as those of a conventional tape cartridge which can suppress modulation noise that occurs because of outside oscillation.

According to the present invention, there is provided a tape cartridge comprising a cartridge case made of a complex plastic material made of polyolefin resin, mixed with a filler of 45 percent to 65 percent by weight of said plastic material wherein the filler includes particles made of at least one of calcium carbonate and barium sulfate, said tape cartridge having a dynamic loss of more than $1 \times 10^9$ dyne/cm$^2$ within a range of oscillation frequency of 0.1 Hz to 1000 Hz.

Accordingly, the plastic material made of polyolefin resin provides for a greater phase difference between dynamic distortion and stress which occurs when the stress is applied to the tape cartridge case, and the filler provides for almost the same complex modulus of elasticity as the complex modulus of elasticity of a conventional cartridge case, resulting in a larger slope of the complex modulus E1 of elasticity which leads to a larger dynamic loss Eb, as shown by the broken line of FIG. 4. Therefore, the tape cartridge according to the present invention can prevent a running tape arranged in the tape cartridge from oscillating because outside oscillation is attenuated in the tape cartridge, and also the tape cartridge can reduce modulation noise which occurs because of the outside oscillation.

DETAILED DESCRIPTION OF THE PREFERRED EMBODIMENTS

In an embodiment according to the present invention, a cartridge case is made of a complex plastic material mixed with a filler. In order to reduce the outside oscillation of the magnetic tape cartridge which occurs by transfer from a motor etc. arranged in a tape recorder to the magnetic tape cartridge, the complex plastic material is made of a mixture of a plastic base made of polyolefin, such as polyethylene, and polypropylene etc., and a filler in an amount of 45 percent to 65 percent by weight of the plastic base which includes particles made of calcium carbonate or barium sulfate. The cartridge case of the embodiment can have a dynamic loss of more than $1 \times 10^9$ dyne/cm$^2$ within a range of oscillation frequency of 0.1 Hz to 1000 Hz.

The reason why the mixture ratio of the filler is in the range of 45 percent to 65 percent by weight of the plastic base is as follows. That is, if the mixture ratio is less than 45 percent, the cartridge case may break often, while on the other hand, if the mixture ratio is more than 65 percent, the plastic material may not fill in a mold properly when the plastic material is formed in a shape because of the lower fluidity of the plastic material, resulting in problems which occur in the manufacturing process and the manufacturing technique.

Furthermore, at a range of oscillation frequency of more than 3000 Hz, it is known that there is no attenuation effect of the modulation noise dependent upon the difference in the plastic materials used. The oscillating members such as a motor etc. arranged in a tape recorder often oscillate at an oscillation frequency less than 1000 Hz.

Figure 3:
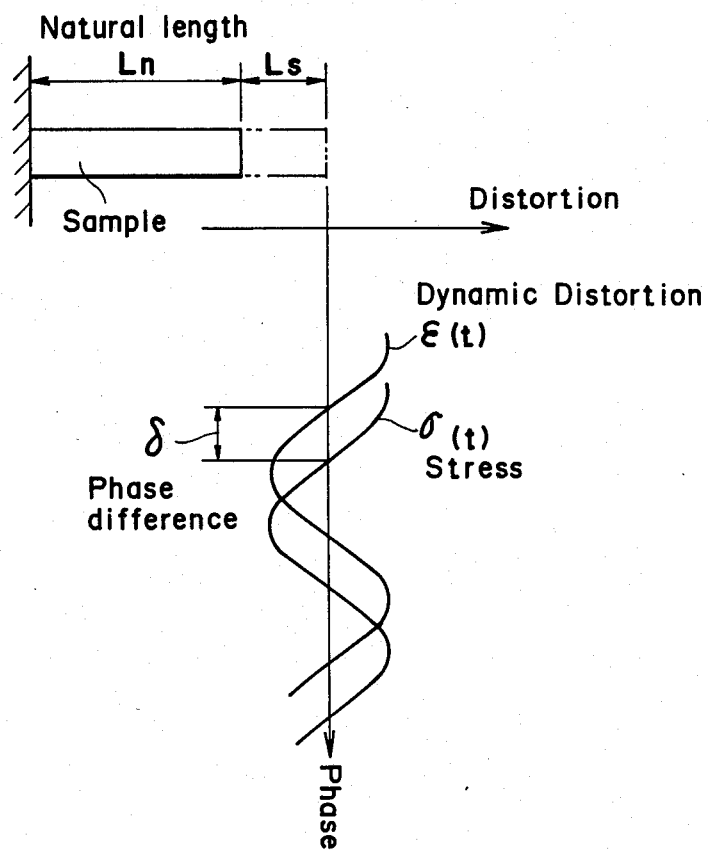
FIG. 3 is a diagram for explaining the principle aspect of a test method of modulation noise.

The plastic material polyolefin is not harder than styrene and polyethylene which are conventional and general case forming materials, and therefore, when a periodic and dynamic distortion occurs by the aforementioned outside oscillation $\epsilon(t)$, there is a phase difference $\delta$ between the dynamic distortion $\epsilon(t)$ and the response of the stress $\sigma(t)$, as shown in FIG. 3, wherein a larger dynamic distortion occurs and there is a larger phase difference. The plastic material mixed with the filler has the same hardness as the conventional case forming material, and has a larger modulus of elasticity than the plastic material base with no filler. Thus, the magnetic tape cartridge made of the plastic material mixed with the filler has both a proper softness and a proper hardness, resulting in that the outside oscillation can be effectively attenuated and the modulation noise can be reduced.

When a stress $\sigma(t)$ is applied to the cartridge case varying periodically, a dynamic distortion $\epsilon(t)$ occurs in the cartridge case in response thereto, wherein the complex modulus E1 of elasticity is composed of a dynamic modulus Ea of elasticity and a dynamic loss Eb, and the complex modulus E1 of elasticity is presented by the following equation.

$$E1 = \sigma(t)/\epsilon(t) = Ea + Eb \qquad (1)$$

Figure 4:
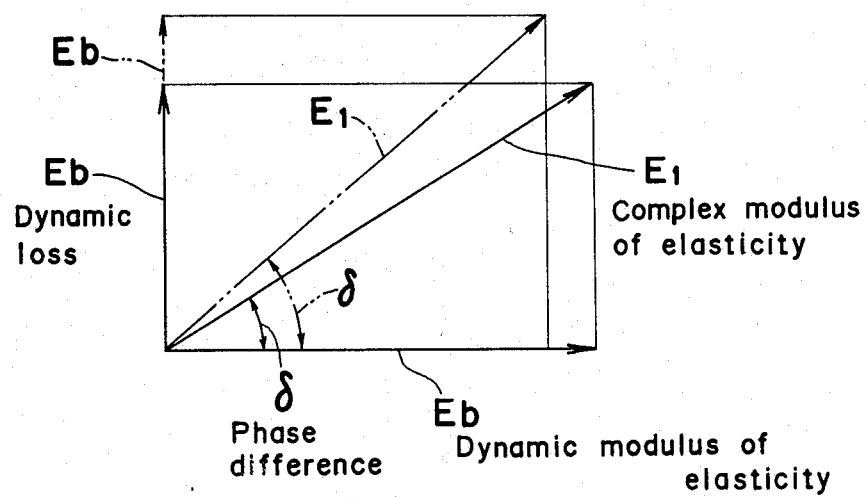
FIG. 4 is a vector diagram showing the relation between complex modulus of elasticity and dynamic loss.

Moreover, the relation between the complex modulus E1 of elasticity, the dynamic modulus Ea of elasticity, and the dynamic loss Eb is drawn as shown in FIG. 4. The dynamic loss Eb is presented by the following equation.

$$Eb = |E1| \sin \sigma \qquad (2)$$

When the dynamic loss Eb is larger, the outside oscillation can be reduced effectively, and therefore, when the complex modulus E1 of elasticity and the phase difference $\delta$ are larger, the attenuation rate of the cartridge case can be improved.

The test method and the test results will now be described below in detail.

Embodiment according to the present invention

A filler made of particles of calcium carbonate was mixed with a plastic base at a ratio of 55 percent by weight of the plastic base, the plastic base being polypropylene. Then the plastic base and filler mixture was formed into the shape of a magnetic tape cartridge for recording and playing back audio signals by an injection forming device.

Comparative example

In order to compare the embodiment described above, a filler made of particles made of the aforementioned calcium carbonate was mixed with a plastic base at a rate of 20 percent by weight of the plastic base, the plastic base being made of styrene resin. Then the plastic base a filler mixture was formed into the shape of a magnetic tape cartridge in a similar method to the aforementioned manner.

Conventional example

A plastic base made only of styrene resin was formed in the shape of magnetic tape cartridge in a similar manner to the aforementioned method.

Test method

The aforementioned cartridge cases of the embodiment of the present invention, the comparative example, and the conventional example were tested as follows.

First of all, as shown in FIG. 3, the end portion of the sample was fixed and a stress was applied to the samples so as to cause an initial distortion Ls, then another stress was applied to the samples so as to cause an oscillation distortion with a sine curve having a center of initial distortion Ls, and the stress and the oscillation distortion caused by the above applied stress were then measured. After that, the complex modulus E1 of elasticity, the dynamic loss Eb, and the dynamic modulus Ea of elasticity were calculated by a computer using the measured values. The above process was performed varying the oscillation frequency in a range of 0.1 Hz to 1000 Hz.

Figure 2:
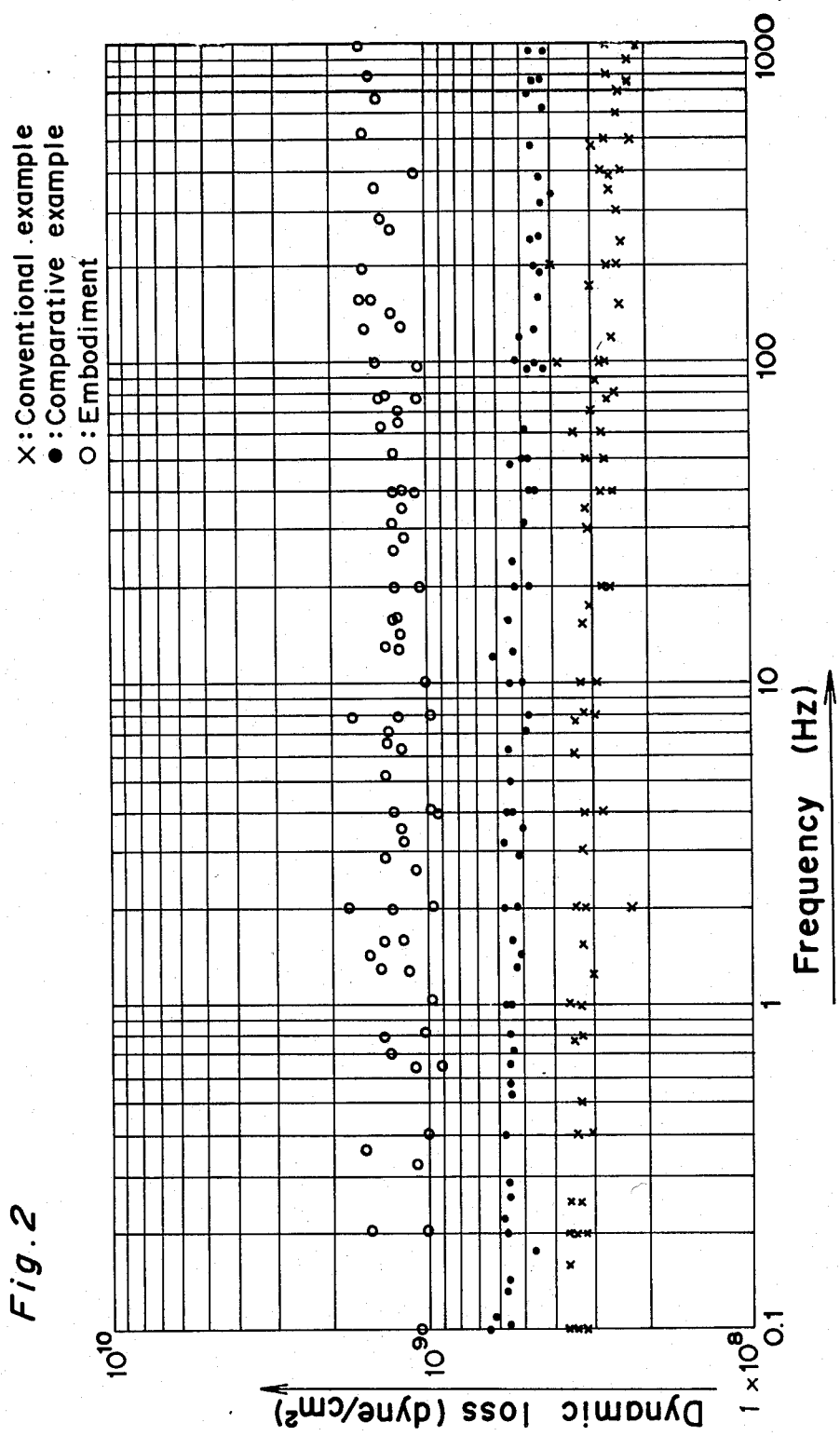
FIG. 2 is a graph of an oscillation frequency characteristics of a dynamic loss of the magnetic tape cartridges of an embodiment of the present invention, a comparative example, and a conventional example.

FIG. 2 shows a graph plotted by the calculation result obtained by the aforementioned process. In the frequency characteristic of FIG. 2, the abscissa axis indicates the oscillation frequency (Hz), and the ordinate axis indicates the dynamic loss Eb (dyne/cm$^2$). In each of the plotted data, o designates the data of the embodiment according to the present invention, . designates the data of the comparative example, and x designates the data of the conventional example.

The following conclusions are apparent from the frequency characteristics of FIG. 2. That is, the data of the dynamic loss Eb of the conventional example have a center value of $3 \times 10^8$ dyne/cm$^2$, and a decreasing characteristic as the oscillation frequency increases or decreases from the oscillation frequency of the center value of the dynamic loss Eb. The data of the dynamic loss Eb of the comparative example also have a center value of $5 \times 10^8$ dyne/cm$^2$, and a decreasing characteristic as the oscillation frequency increases or decreases from the oscillation frequency of the center value of the dynamic loss Eb. On the other hand, the data of the dynamic loss Eb of the embodiment according to the present are in the range of $10^9$ to $2 \times 10^9$ dyne/cm$^2$, and have a center value of approximately $1.3 \times 10^9$ dyne/cm$^2$. As is evident from these results, the embodiment of the present invention has a dynamic loss Eb which is more than four times as large as the dynamic loss Eb of the conventional example, and also which is more than two and half times as large as the dynamic loss Eb of the comparative example. This means that outside oscillation can be attenuated effectively by the embodiment according to the present invention.

Furthermore, the specific gravities of each of the samples of the conventional example, the comparative example, and the embodiment of the present invention were 1.04, 1.2, and 1.4, respectively. Moreover, the cartridge cases of the plastic base made of polypropylene mixed with the filler of a mixture ratio in the range of 45 percent to 65 percent by weight were tested by the aforementioned testing method, and similar results of the dynamic loss of each of the samples were obtained.

Figure 1:
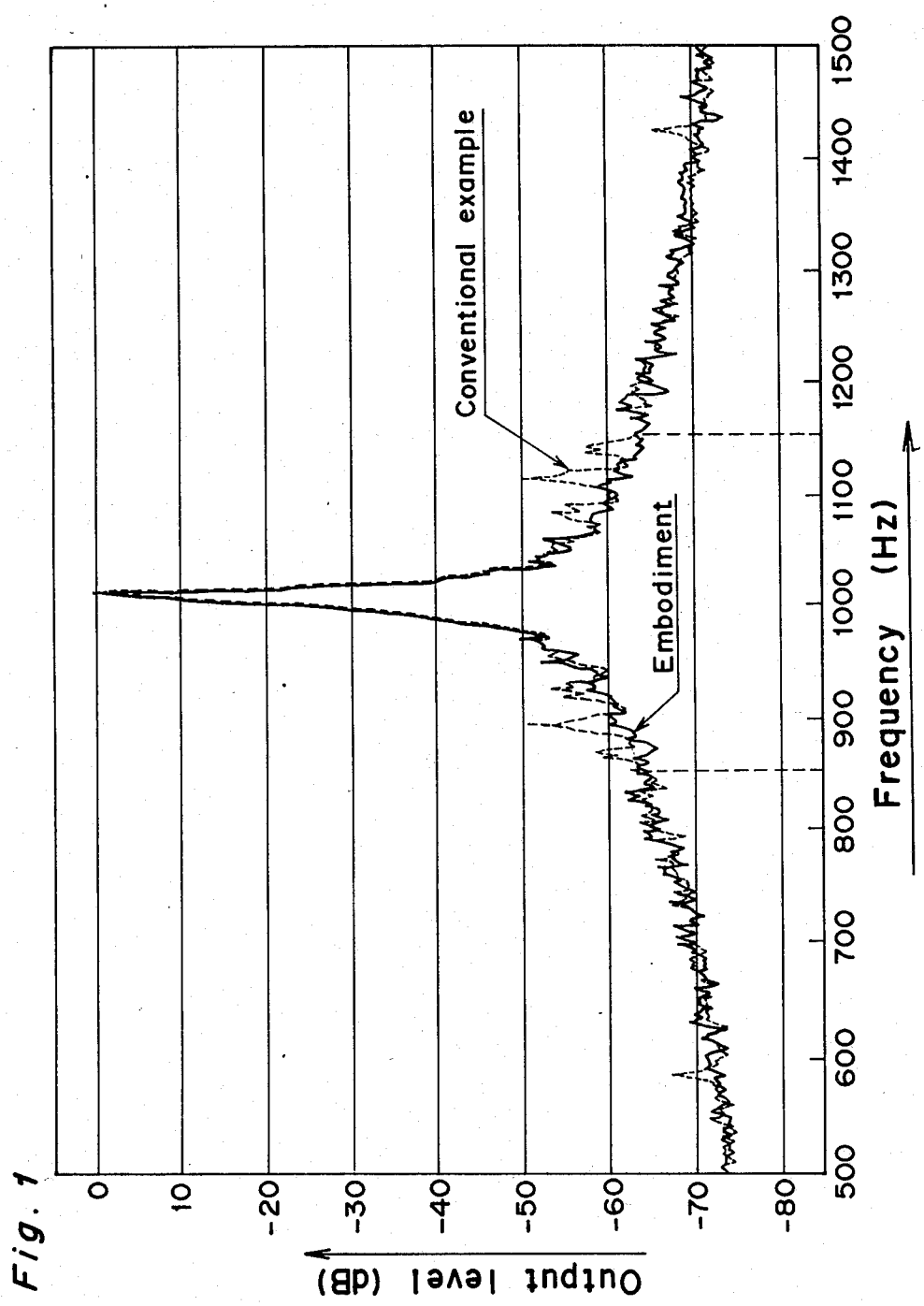
FIG. 1 is a graph of frequency characteristics of modulation noise of a conventional magnetic tape cartridge and a magnetic tape cartridge of an embodiment according to the present invention.

Next, the acoustic characteristics of the embodiment of the present invention and the conventional example were measured in order to confirm the effect of the dynamic loss Eb affected by the modulation noise. FIG. 1 shows frequency characteristics of the modulation noise level of the embodiment according to the present invention and the conventional example. In FIG. 1, a real line designates the frequency characteristic of the modulation noise level of the embodiment according to the present invention, and a dotted line designates the frequency characteristic of the modulation noise level of the conventional example. It is apparent from the frequency characteristics of FIG. 1, that the modulation noise level of the embodiment of the present invention is in the range of 5 dB to 10 dB less than the modulation noise level of the conventional example within the frequency range of 850 Hz to 1150 Hz.

Other embodiments

In the aforementioned embodiment, a filler made of calcium carbonate in the form of particles was mixed into the plastic base. However, as an alternative, a filler made of barium sulfate in the form of particles, which has characteristics similar to those of the filler made of calcium carbonate, may be used. A filler made of silicon or glass is not suitable for the filler of the magnetic tape cartridge of the present invention, because the injection forming device is abraded abrased by fillers made of the silicon or glass.

Moreover, the aforementioned plastic base may be made of polyethylene, and the present invention is not limited to the aforementioned embodiment.

Furthermore, the magnetic tape cartridge according to the present invention can be applied not only to audio tape cartridges but also to other sorts of the tape cartridges.

What is claimed is:

1. A tape cartridge case formed from a composition which comprises a mixture of:
   a plastic base material comprising a polyolefin resin, and
   a filler in an amount of 45 percent to 65 percent by weight of said plastic base material said filler comprising particles of at least one compound selected from the group consisting of calcium carbonate and barium sulfate,
   wherein said tape cartridge case exhibits a dynamic loss of more than $1 \times 10^9$ dyne/cm$^2$ within a range of oscillation frequency of from 0.1 Hz to 1000 Hz.

2. A tape cartridge case as defined in claim 1, wherein said plastic base material comprises polyethylene or polypropylene.

3. A tape cartridge case as defined by claim 2, wherein said plastic base material comprises polypropylene.

4. A tape cartridge case as defined in claim 2, wherein said plastic base material comprises polyethylene.

5. A tape cartridge case as defined in claim 1, wherein said filler comprises calcium carbonate.

6. A tape cartridge case as defined in claim 1, wherein said filler comprises barium sulfate.

7. A tape cartridge case as defined in claim 1, wherein said plastic base material comprises polypropylene and said filler comprises calcium carbonate.

8. A tape cartridge case as defined in claim 7, wherein said filler is in an amount of about 55 percent.

9. A tape cartridge case comprising:
   an upper case and a lower case, wherein said tape cartridge is formed from a composition which comprises a mixture of,
   a plastic base material comprising a polyolefin resin, and
   a filler in an amount of 45 percent to 65 percent by weight of said plastic base material, said filler comprising particles of at least one compound selected from the group consisting of calcium carbonate and barium sulfate,
   wherein said tape cartridge case exhibits a dynamic loss of more than $1 \times 10^9$ dyne/cm$^2$ within a range of oscillation frequency of from 0.1 Hz to 1000 Hz.

10. A tape cartridge case as defined in claim 9, wherein said plastic base material comprises polypropylene.

11. A tape cartridge case as defined in claim 9, wherein said plastic base material comprises polypropylene and said filler comprises calcium carbonate.

* * * * *